US012099121B2

United States Patent
Jin et al.

(10) Patent No.: US 12,099,121 B2
(45) Date of Patent: Sep. 24, 2024

(54) TRAILER ANGLE MEASUREMENT METHOD AND DEVICE, AND VEHICLE

(71) Applicant: Beijing Tusen Zhitu Technology Co., Ltd., Beijing (CN)

(72) Inventors: Yuhe Jin, Beijing (CN); Nan Wu, Beijing (CN); Yiming Li, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 660 days.

(21) Appl. No.: 17/343,489

(22) Filed: Jun. 9, 2021

(65) Prior Publication Data
US 2021/0349217 A1    Nov. 11, 2021

Related U.S. Application Data

(63) Continuation of application No. PCT/CN2019/077075, filed on Mar. 6, 2019.

(30) Foreign Application Priority Data

Dec. 10, 2018   (CN) .......................... 201811505593.1

(51) Int. Cl.
*G01S 17/89*    (2020.01)
*G01B 11/26*    (2006.01)
(Continued)

(52) U.S. Cl.
CPC .............. *G01S 17/89* (2013.01); *G01B 11/26* (2013.01); *G01S 7/4802* (2013.01);
(Continued)

(58) Field of Classification Search
CPC ......... G01G 1/167; G01S 17/89; G01S 17/42; G01S 17/87; G01S 17/931; G01S 17/88;
(Continued)

(56) References Cited

U.S. PATENT DOCUMENTS 6,084,870 A    7/2000 Wooten et al.
6,263,088 B1   7/2001 Crabtree
(Continued)

FOREIGN PATENT DOCUMENTS

CN    105547288 A    5/2016
CN    106340197 A    1/2017
(Continued)

OTHER PUBLICATIONS

Japanese Patent Office, 1st Examination Report for JP 2021-533593, Mailing Date: Feb. 22, 2023, 6 pages with English translation.
(Continued)

*Primary Examiner* — Hoa Q Pham
(74) *Attorney, Agent, or Firm* — Perkins Coie LLP

(57) ABSTRACT

The present disclosure provides a method and an apparatus for trailer angle measurement, as well as a vehicle, applied in a vehicle including a tractor and a trailer. At least one LiDAR is provided on each of two sides of the tractor. The method includes: obtaining, an initial trailer model containing initial point cloud data; controlling the to emit laser light; controlling each of the LiDARs to receive a corresponding point cloud reflected by the surface of the trailer; and calculating a trailer angle based on the point cloud data and the initial point cloud data using a point cloud matching algorithm. With the embodiments of the present disclosure, fast and accurate measurement of a trailer angle can be achieved with a simple structure.

18 Claims, 10 Drawing Sheets

(51) Int. Cl.
  *G01S 7/48* (2006.01)
  *G01S 17/42* (2006.01)
  *G01S 17/87* (2020.01)
  *G01S 17/88* (2006.01)
  *B62D 53/06* (2006.01)
  *G01B 11/24* (2006.01)
  *G01S 17/02* (2020.01)

(52) U.S. Cl.
  CPC ............ *G01S 7/4808* (2013.01); *G01S 17/42* (2013.01); *G01S 17/87* (2013.01); *G01S 17/88* (2013.01); *B62D 53/06* (2013.01); *G01B 11/24* (2013.01); *G01S 17/02* (2013.01)

(58) Field of Classification Search
  CPC ........ G01S 17/02; G01S 17/06; G01S 7/4802; G01S 7/4808; G01S 7/53; G01S 7/486; G01B 11/26; G01B 11/24; B62D 15/021; G06F 17/11
  USPC .......................................................... 356/138
  See application file for complete search history.

(56) References Cited

U.S. PATENT DOCUMENTS

| | | |
|---|---|---|
| 6,594,821 B1 | 7/2003 | Banning et al. |
| 6,777,904 B1 | 8/2004 | Degner |
| 6,975,923 B2 | 12/2005 | Spriggs |
| 7,103,460 B1 | 9/2006 | Breed |
| 7,689,559 B2 | 3/2010 | Canright |
| 7,742,841 B2 | 6/2010 | Sakai et al. |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,346,480 B2 | 1/2013 | Trepagnier et al. |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,532,870 B2 | 9/2013 | Hoetzer et al. |
| 8,553,088 B2 | 10/2013 | Stein |
| 8,706,394 B2 | 4/2014 | Trepagnier et al. |
| 8,718,861 B1 | 5/2014 | Montemerlo et al. |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,983,708 B2 | 3/2015 | Choe et al. |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,081,385 B1 | 7/2015 | Ferguson et al. |
| 9,088,744 B2 | 7/2015 | Grauer et al. |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,214,084 B2 | 12/2015 | Grauer et al. |
| 9,219,873 B2 | 12/2015 | Grauer et al. |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman et al. |
| 9,317,776 B1 | 4/2016 | Honda |
| 9,330,334 B2 | 5/2016 | Lin |
| 9,342,074 B2 | 5/2016 | Dolgov |
| 9,347,779 B1 | 5/2016 | Lynch |
| 9,355,635 B2 | 5/2016 | Gao |
| 9,365,214 B2 | 6/2016 | Ben Shalom |
| 9,399,397 B2 | 7/2016 | Mizutani |
| 9,418,549 B2 | 8/2016 | Kang et al. |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,483,839 B1 | 11/2016 | Kwon |
| 9,490,064 B2 | 11/2016 | Hirosawa |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,555,803 B2 | 1/2017 | Pawlicki |
| 9,568,915 B1 | 2/2017 | Berntorp |
| 9,587,952 B1 | 3/2017 | Slusar |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,612,123 B1 | 4/2017 | Levinson et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,652,860 B1 | 5/2017 | Maali |
| 9,669,827 B1 | 6/2017 | Ferguson et al. |
| 9,672,446 B1 | 6/2017 | Vallesi-Gonzalez |
| 9,690,290 B2 | 6/2017 | Prokhorov |
| 9,701,023 B2 | 7/2017 | Zhang et al. |
| 9,712,754 B2 | 7/2017 | Grauer et al. |
| 9,720,418 B2 | 8/2017 | Stenneth |
| 9,723,097 B2 | 8/2017 | Harris |
| 9,723,099 B2 | 8/2017 | Chen |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |

(56) References Cited

U.S. PATENT DOCUMENTS

| | | |
|---|---|---|
| 9,805,294 B2 | 10/2017 | Liu et al. |
| 9,810,785 B2 | 11/2017 | Grauer et al. |
| 9,823,339 B2 | 11/2017 | Cohen |
| 9,953,236 B1 | 4/2018 | Huang |
| 10,147,193 B2 | 12/2018 | Huang |
| 10,223,806 B1 | 3/2019 | Yi et al. |
| 10,223,807 B1 | 3/2019 | Yi et al. |
| 10,410,055 B2 | 9/2019 | Wang et al. |
| 11,073,601 B2* | 7/2021 | Nian .................. G01S 17/931 |
| 11,333,766 B2* | 5/2022 | Kozak .................. G01S 17/931 |
| 2003/0114980 A1 | 6/2003 | Klausner et al. |
| 2003/0174773 A1 | 9/2003 | Comaniciu |
| 2004/0264763 A1 | 12/2004 | Mas et al. |
| 2007/0067077 A1 | 3/2007 | Liu et al. |
| 2007/0183661 A1 | 8/2007 | El-Maleh |
| 2007/0183662 A1 | 8/2007 | Wang |
| 2007/0230792 A1 | 10/2007 | Shashua |
| 2007/0286526 A1 | 12/2007 | Abousleman |
| 2008/0249667 A1 | 10/2008 | Horvitz |
| 2009/0040054 A1 | 2/2009 | Wang |
| 2009/0087029 A1 | 4/2009 | Coleman |
| 2010/0049397 A1 | 2/2010 | Lin |
| 2010/0111417 A1 | 5/2010 | Ward |
| 2010/0226564 A1 | 9/2010 | Marchesotti |
| 2010/0281361 A1 | 11/2010 | Marchesotti |
| 2011/0142283 A1 | 6/2011 | Huang |
| 2011/0206282 A1 | 8/2011 | Aisaka |
| 2011/0247031 A1 | 10/2011 | Jacoby |
| 2011/0257860 A1 | 10/2011 | Getman et al. |
| 2012/0041636 A1 | 2/2012 | Johnson et al. |
| 2012/0105639 A1 | 5/2012 | Stein |
| 2012/0114181 A1 | 5/2012 | Borthwick et al. |
| 2012/0140076 A1 | 6/2012 | Rosenbaum |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko |
| 2013/0182134 A1 | 7/2013 | Grundmann et al. |
| 2013/0204465 A1 | 8/2013 | Phillips et al. |
| 2013/0266187 A1 | 10/2013 | Bulan |
| 2013/0329052 A1 | 12/2013 | Chew |
| 2014/0072170 A1 | 3/2014 | Zhang |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa |
| 2014/0198184 A1 | 7/2014 | Stein |
| 2014/0321704 A1 | 10/2014 | Partis |
| 2014/0334668 A1 | 11/2014 | Saund |
| 2015/0062304 A1 | 3/2015 | Stein |
| 2015/0269438 A1 | 9/2015 | Samarsekera et al. |
| 2015/0310370 A1 | 10/2015 | Burry |
| 2015/0353082 A1 | 12/2015 | Lee et al. |
| 2016/0008988 A1 | 1/2016 | Kennedy |
| 2016/0026787 A1 | 1/2016 | Nairn et al. |
| 2016/0037064 A1 | 2/2016 | Stein |
| 2016/0094774 A1 | 3/2016 | Li |
| 2016/0118080 A1 | 4/2016 | Chen |
| 2016/0129907 A1 | 5/2016 | Kim |
| 2016/0165157 A1 | 6/2016 | Stein |
| 2016/0210528 A1 | 7/2016 | Duan |
| 2016/0275766 A1 | 9/2016 | Venetianer et al. |
| 2016/0280261 A1 | 9/2016 | Kyrtsos et al. |
| 2016/0321381 A1 | 11/2016 | English |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0368336 A1 | 12/2016 | Kahn et al. |
| 2016/0375907 A1 | 12/2016 | Erban |
| 2017/0053169 A1 | 2/2017 | Cuban et al. |
| 2017/0061632 A1 | 3/2017 | Linder et al. |
| 2017/0080928 A1 | 3/2017 | Wasiek et al. |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0301104 A1 | 10/2017 | Qian |
| 2017/0305423 A1 | 10/2017 | Green |
| 2017/0318407 A1 | 11/2017 | Meister |
| 2017/0334484 A1 | 11/2017 | Koravadi |
| 2018/0057052 A1 | 3/2018 | Dodd et al. |
| 2018/0151063 A1 | 5/2018 | Pun |
| 2018/0158197 A1 | 6/2018 | Dasgupta |
| 2018/0260956 A1 | 9/2018 | Huang |
| 2018/0283892 A1 | 10/2018 | Behrendt |
| 2018/0341021 A1 | 11/2018 | Schmitt et al. |
| 2018/0373980 A1 | 12/2018 | Huval |
| 2019/0025853 A1 | 1/2019 | Julian |
| 2019/0065863 A1 | 2/2019 | Luo et al. |
| 2019/0066329 A1 | 2/2019 | Yi et al. |
| 2019/0066330 A1 | 2/2019 | Yi et al. |
| 2019/0066344 A1 | 2/2019 | Yi et al. |
| 2019/0084477 A1 | 3/2019 | Gomez-Mendoza et al. |
| 2019/0108384 A1 | 4/2019 | Wang et al. |
| 2019/0132391 A1 | 5/2019 | Thomas |
| 2019/0132392 A1 | 5/2019 | Liu |
| 2019/0170867 A1 | 6/2019 | Wang et al. |
| 2019/0210564 A1 | 7/2019 | Han |
| 2019/0210613 A1 | 7/2019 | Sun |
| 2019/0236950 A1 | 8/2019 | Li |
| 2019/0266420 A1 | 8/2019 | Ge |
| 2021/0291902 A1* | 9/2021 | Wang .................. G01S 7/4808 |
| 2021/0356261 A1* | 11/2021 | Jin .................. G01S 17/89 |
| 2022/0343535 A1* | 10/2022 | Ip .................. G06T 7/73 |
| 2023/0114328 A1* | 4/2023 | Tan .................. G01S 17/931 |
| | | 356/4.01 |

FOREIGN PATENT DOCUMENTS

| | | |
|---|---|---|
| CN | 106781591 A | 5/2017 |
| CN | 107728156 A | 2/2018 |
| CN | 107980102 A | 5/2018 |
| CN | 108010360 A | 5/2018 |
| CN | 108132471 A | 6/2018 |
| CN | 108278981 A | 7/2018 |
| CN | 108519604 A | 9/2018 |
| CN | 108717182 A | 10/2018 |
| CN | 108749923 A | 11/2018 |
| CN | 108761479 A | 11/2018 |
| CN | 108761481 A | 11/2018 |
| CN | 208059845 U | 11/2018 |
| CN | 108959173 A | 12/2018 |
| DE | 2608513 A1 | 9/1977 |
| DE | 102016105259 A1 | 9/2016 |
| DE | 102017125662 A1 | 5/2018 |
| EP | 890470 B1 | 1/1999 |
| EP | 1754179 A1 | 2/2007 |
| EP | 2448251 A2 | 5/2012 |
| EP | 2463843 A2 | 6/2012 |
| EP | 2761249 A1 | 8/2014 |
| EP | 2946336 A2 | 11/2015 |
| EP | 2993654 A1 | 3/2016 |
| EP | 3081419 A1 | 10/2016 |
| GB | 2513392 A | 10/2014 |
| JP | 2001334966 A | 12/2001 |
| JP | 2005293350 A | 10/2005 |
| JP | 3721911 B2 | 11/2005 |
| JP | 2012225806 A | 11/2012 |
| JP | 2022515355 A | 2/2022 |
| KR | 100802511 A1 | 2/2008 |
| WO | 1991009375 A1 | 6/1991 |
| WO | 2005098739 A1 | 10/2005 |
| WO | 2005098751 A1 | 10/2005 |
| WO | 2005098782 A1 | 10/2005 |
| WO | 2010109419 A | 9/2010 |
| WO | 2013045612 A1 | 4/2013 |
| WO | 2014111814 A2 | 7/2014 |
| WO | 2014166245 A1 | 10/2014 |
| WO | 2014201324 A1 | 12/2014 |
| WO | 2015083009 A1 | 6/2015 |
| WO | 2015103159 A1 | 7/2015 |
| WO | 2015125022 A2 | 8/2015 |
| WO | 2015186002 A2 | 12/2015 |
| WO | 2016090282 A1 | 6/2016 |
| WO | 2016135736 A2 | 9/2016 |

(56) References Cited

FOREIGN PATENT DOCUMENTS

| WO | 2017079349 A1 | 5/2017 |
|----|---------------|--------|
| WO | 2017079460 A2 | 5/2017 |
| WO | 2017013875 A1 | 5/2018 |
| WO | 2019040800 A1 | 2/2019 |
| WO | 2019084491 A1 | 5/2019 |
| WO | 2019084494 A1 | 5/2019 |
| WO | 2019140277 A2 | 7/2019 |
| WO | 2019168986 A1 | 9/2019 |

OTHER PUBLICATIONS

Office Action in Chinese Patent Application No. 201811505593.1 dated Sep. 29, 2021.

Nyberg, Patrik, "Stabilization, Sensor Fusion and Path Following for Autonomous Reversing of a Full-Scale Truck and Trailer System," Master of Science in Electrical Engineering, Department of Electrical Engineering, Linköping University, 2016, 50 pages, Sweden.

European Patent Office, Extended European Search Report for EP 19896541, Mailing Date: Jul. 8, 2022, 10 pages.

Chinese Patent Office, Third Office Action for CN 201811505593.1, Mailing Date: Nov. 3, 2022, 10 pages with English translation.

Chinese Patent Office, Second Office Action for CN 201811505593. 1, Mailing Date: Jul. 5, 2022, 33 pages with English translation.

Carle, Patrick J.F. et al. "Global Rover Localization by Matching Lidar and Orbital 3D Maps." IEEE, Anchorage Convention District, pp. 1-6, May 3-8, 2010. (Anchorage Alaska, US).

Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690. Springer, Cham.

Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.

Sattler, T. et al., "Are Large-Scale 3D Models Really Necessary for Accurate Visual Localization?" CVPR, IEEE, 2017, pp. 1-10.

Engel, J. et la. "LSD-SLAM: Large Scare Direct Monocular SLAM," pp. 1-16, Munich.

Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.

International Application No. PCT/US2019/013322, International Search Report and Written Opinion Mailed Apr. 2, 2019.

International Application No. PCT/US19/12934, International Search Report and Written Opinion Mailed Apr. 29, 2019.

International Application No. PCT/US18/53795, International Search Report and Written Opinion Mailed Dec. 31, 2018.

International Application No. PCT/US18/57848, International Search Report and Written Opinion Mailed Jan. 7, 2019.

International Application No. PCT/US2018/057851, International Search Report and Written Opinion Mailed Feb. 1, 2019.

International Application No. PCT/US2019/019839, International Search Report and Written Opinion Mailed May 23, 2019.

International Application No. PCT/US19/25995, International Search Report and Written Opinion Mailed Jul. 9, 2019.

Geiger, Andreas et al., "Automatic Camera and Range Sensor Calibration using a single Shot", Robotics and Automation (ICRA), pp. 1-8, 2012 IEEE International Conference.

Zhang, Z. et al. A Flexible new technique for camera calibration. IEEE Transactions on Pattern Analysis and Machine Intelligence (vol. 22, Issue: 11, Nov. 2000).

International Application No. PCT/US2018/047830, International Search Report and Written Opinion Mailed Dec. 28, 2018.

Bar-Hillel, Aharon et al. "Recent progress in road and lane detection: a survey." Machine Vision and Applications 25 (2011): 727-745.

Schindler, Andreas et al. "Generation of high precision digital maps using circular arc splines," 2012 IEEE Intelligent Vehicles Symposium, Alcala de Henares, 2012, pp. 246-251. doi: 10.1109/IVS. 2012.6232124.

International Application No. PCT/US2018/047608, International Search Report and Written Opinion Mailed Dec. 28, 2018.

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching For Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302. 5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701. 01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Li, Yanghao and Wang, Naiyan and Liu, Jiaying and Hou, Xiaodi, "Factorized Bilinear Models for Image Recognition", arXiv preprint arXiv:1611.05709, 2016.

Hou, Xiaodi, "Computational Modeling and Psychophysics in Low and Mid-Level Vision", California Institute of Technology, 2014.

Spinello, Luciano, Triebel, Rudolph, Siegwart, Roland, "Multiclass Multimodal Detection and Tracking in Urban Environments", Sage Journals, vol. 29 Issue 12, pp. 1498-1515 Article first published online: Oct. 7, 2010; Issue published: Oct. 1, 2010.

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612. 06573v1 [cs.CV] Dec. 20, 2016.

(56) References Cited

OTHER PUBLICATIONS

Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Office Action Mailed in Chinese Application No. 201810025516.X, Mailed Sep. 3, 2019.
Luo, Yi et al. U.S. Appl. No. 15/684,389 Notice of Allowance Mailed Oct. 9, 2019.
International Application No. PCT/US19/58863, International Search Report and Written Opinion mailed Feb. 14, 2020, pp. 1-11.
US Patent & Trademark Office, Non-Final Office Action mailed Apr. 29, 2020 in U.S. Appl. No. 16/174,980, 6 pages.
US Patent & Trademark Office, Final Office Action mailed Sep. 8, 2020 in U.S. Appl. No. 16/174,980, 8 pages.
International Application No. PCT/CN2019/077075, International Search Report and Written Opinion Mailed Sep. 10, 2019, pp. 1-12.
International Application No. PCT/CN2019/077075, International Preliminary Report on Patentability Mailed Jun. 8, 2021, pp. 1-4.
European Patent Office, Communication pursuant to Article 94(3) EPC for EP Appl. No. 19896541.0, mailed on Feb. 19, 2024, 6 pages.
Japanese Patent Office, Notice of Refusal for JP 2023-129340, Mailing Date: Apr. 19, 2024, 4 pages with English translation.

\* cited by examiner

TRAILER ANGLE MEASUREMENT METHOD AND DEVICE, AND VEHICLE

CROSS-REFERENCE TO RELATED APPLICATIONS

The present disclosure is a continuation of and claims priority to International Application No. PCT/CN2019/077075 entitled "TRAILER ANGLE MEASUREMENT METHOD AND DEVICE, AND VEHICLE", filed Mar. 6, 2019 and which claims priority to Chinese Patent Application No. 201811505593.1, titled "TRAILER ANGLE MEASUREMENT METHOD AND DEVICE, AND VEHICLE", filed on Dec. 10, 2018, the content of which is incorporated herein by reference in its entirety.

TECHNICAL FIELD

The present disclosure relates to vehicle technology, and more particularly, to a method and an apparatus for trailer angle measurement, as well as a vehicle.

BACKGROUND

Currently, with the development of the logistics transportation industry, vehicles with tractors and trailers (hereinafter referred to as semi-trailers), such as container trucks, are becoming increasingly popular. As a heavy transportation tool, a semi-trailer is more capable of improving overall economic benefits of road transportation than an ordinary truck. With the development of autonomous driving technology, a trailer angle (e.g., in FIG. 1 which is a top view of a semi-trailer, the trailer angle refers to the angle α between the central axis of the tractor 11 and the central axis of the trailer 12), as a basis for autonomous driving planning and control point, has become a focus of research.

The existing method for trailer angle measurement can only measure small trailer angles. When the trailer angle is relatively large (e.g., larger than ±40°), it is difficult to obtain the trailer angle accurately. Thus, how to implement fast and accurate measurement of a trailer angle with a simple structure has become a problem to be solved.

SUMMARY

The embodiments of the present disclosure provide a method and an apparatus for trailer angle measurement, as well as a vehicle, capable of achieving fast and accurate measurement of a trailer angle with a simple structure.

In order to achieve the above object, the following technical solutions are provided.

In an aspect, a method for trailer angle measurement is provided according to an embodiment of the present disclosure. The method is applied in a semi-trailer including a tractor and a trailer. At least one multi-line LiDAR is provided on each of two sides of the tractor. The method includes: obtaining, in a predetermined vehicle coordinate system, an initial trailer model corresponding to an initial trailer angle value, to obtain initial point cloud data in the initial trailer model; controlling the multi-line LiDAR provided on each of the two sides of the tractor to emit laser light, such that a surface of the trailer reflects the laser light emitted by the multi-line LiDAR; controlling each of the multi-line LiDARs to receive a corresponding laser point cloud reflected by the surface of the trailer; and calculating a trailer angle based on the corresponding laser point clouds received by the respective multi-line LiDARs and the initial point cloud data using a point cloud matching algorithm.

In another aspect, an apparatus for trailer angle measurement is provided according to an embodiment of the present disclosure. The apparatus is applied in a semi-trailer including a tractor and a trailer. At least one multi-line LiDAR is provided on each of two sides of the tractor. The apparatus is communicatively connected to the multi-line LiDARs. The apparatus includes a memory, a processor, and a computer program stored on the memory and executable by the processor. The processor is configured to, when executing the computer program, perform a process of trailer angle measurement. The process includes: obtaining, in a predetermined vehicle coordinate system, an initial trailer model corresponding to an initial trailer angle value, to obtain initial point cloud data in the initial trailer model; controlling the multi-line LiDAR provided on each of the two sides of the tractor to emit laser light, such that a surface of the trailer reflects the laser light emitted by the multi-line LiDAR; controlling each of the multi-line LiDARs to receive a corresponding laser point cloud reflected by the surface of the trailer; and calculating a trailer angle based on the corresponding laser point clouds received by the respective multi-line LiDARs and the initial point cloud data using a point cloud matching algorithm.

In yet another aspect, a computer-readable storage medium is provided according to an embodiment of the present disclosure. The computer-readable storage medium has a computer program stored thereon. The program, when executed by a processor, implements a process of trailer angle measurement. The process is applied in a semi-trailer including a tractor and a trailer. At least one multi-line LiDAR is provided on each of two sides of the tractor. The process includes: obtaining, in a predetermined vehicle coordinate system, an initial trailer model corresponding to an initial trailer angle value, to obtain initial point cloud data in the initial trailer model; controlling the multi-line LiDAR provided on each of the two sides of the tractor to emit laser light, such that a surface of the trailer reflects the laser light emitted by the multi-line LiDAR; controlling each of the multi-line LiDARs to receive a corresponding laser point cloud reflected by the surface of the trailer; and calculating a trailer angle based on the corresponding laser point clouds received by the respective multi-line LiDARs and the initial point cloud data using a point cloud matching algorithm.

In still another aspect, a vehicle is provided according to an embodiment of the present disclosure. The vehicle includes an apparatus for trailer angle measurement, a tractor, and a trailer. At least one multi-line LiDAR is provided on each of two sides of the tractor. The apparatus for trailer angle measurement is communicatively connected to the multi-line LiDARs. The apparatus for trailer angle measurement includes a memory, a processor, and a computer program stored on the memory and executable by the processor. The processor is configured to, when executing the computer program, perform a process of trailer angle measurement. The process includes: obtaining, in a predetermined vehicle coordinate system, an initial trailer model corresponding to an initial trailer angle value, to obtain initial point cloud data in the initial trailer model; controlling the multi-line LiDAR provided on each of the two sides of the tractor to emit laser light, such that a surface of the trailer reflects the laser light emitted by the multi-line LiDAR; controlling each of the multi-line LiDARs to receive a corresponding laser point cloud reflected by the surface of the trailer; and calculating a trailer angle based on the corresponding laser point clouds received by the respective multi-line LiDARs and the initial point cloud data using a point cloud matching algorithm.

With the method and apparatus for trailer angle measurement and the vehicle according to the embodiments of the present disclosure, at least one multi-line LiDAR is provided on each of two sides of the tractor. The multi-line LiDARs provided on two sides can radiate laser light to the surface of the trailer. Accordingly, a trailer angle can be calculated based on corresponding laser point clouds received by the respective multi-line LiDARs and the initial point cloud data using a point cloud matching algorithm. In addition, in the present disclosure, the trailer angle is calculated based on the corresponding laser point clouds received by the respective multi-line LiDARs and the initial point cloud data corresponding to the initial trailer angle value, instead of a laser point cloud of a single LiDAR, such that the accuracy of the result is greatly improved.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

In order to describe the technical solutions according to the embodiments of the present disclosure or the prior art more clearly, figures used in description of the embodiments or the prior art will be introduced briefly below. Obviously, the figures described below only illustrate some embodiments of the present disclosure, and other figures can be obtained by those of ordinary skill in the art based on these drawings without any inventive efforts.

DETAILED DESCRIPTION OF THE EMBODIMENTS

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In order to allow those skilled in the art to better understand the present disclosure, some of the technical terms used in the embodiments of the present disclosure will be explained as follows:

Point cloud: a set of point data on an outer surface of an object as obtained by a measuring apparatus during reverse engineering.

ICP: Iterative Closest Point algorithm is mainly used for precise merging of depth images in computer vision by iteratively minimizing corresponding points of source data and target data. There are already many variants, mainly focusing on how to efficiently and robustly obtain a better merging effect.

SVD: Singular Value Decomposition algorithm is a reliable method for solving translation vectors and rotation matrices.

Figure 1:
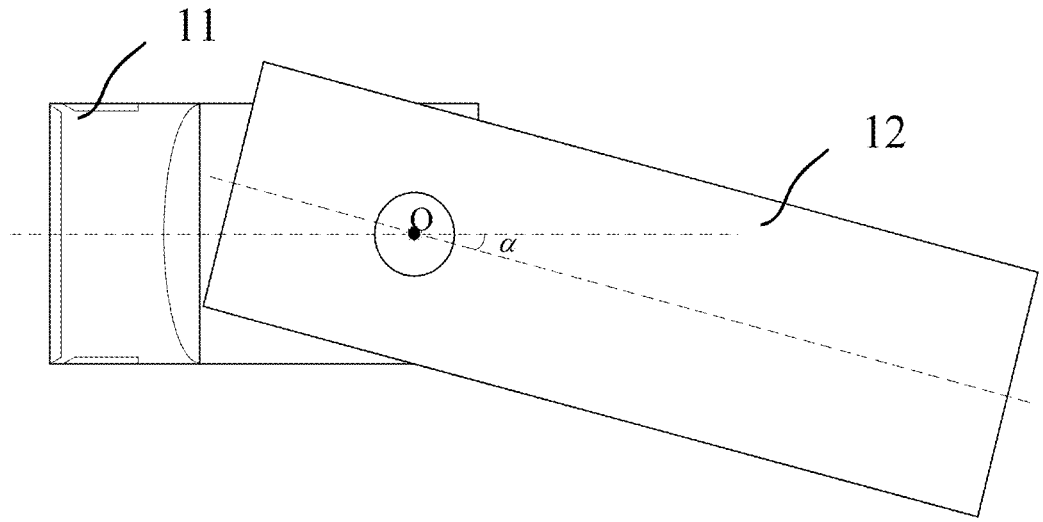
FIG. 1 is a schematic diagram showing a trailer angle.
Figure 2:
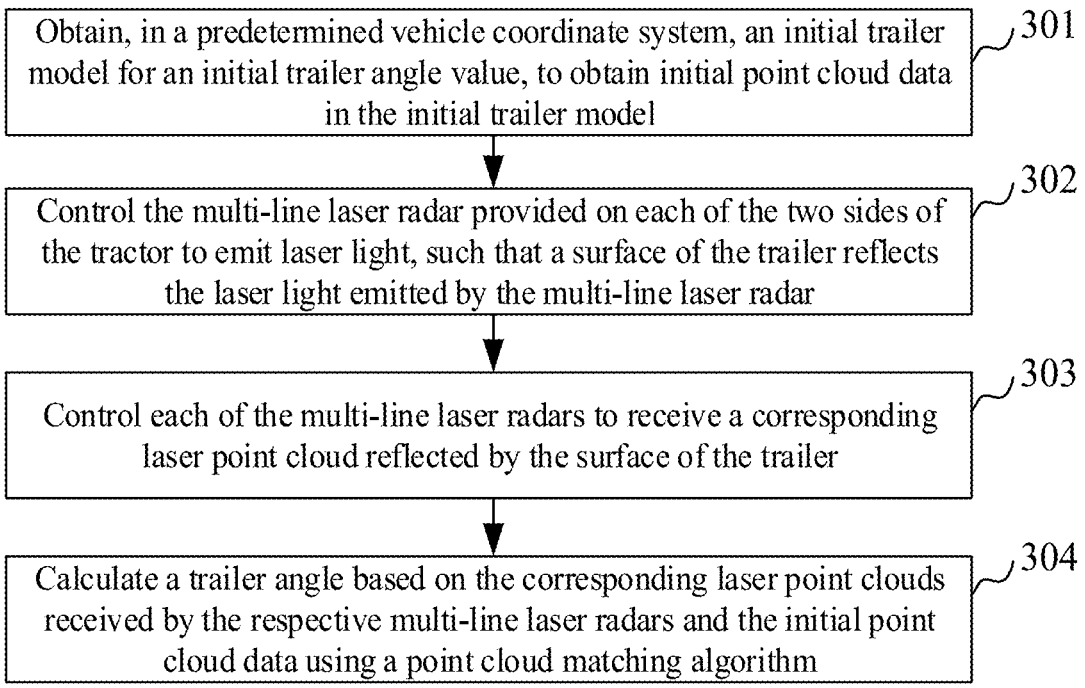
FIG. 2 is a first flowchart illustrating a method for trailer angle measurement according to an embodiment of the present disclosure.
Figure 3:
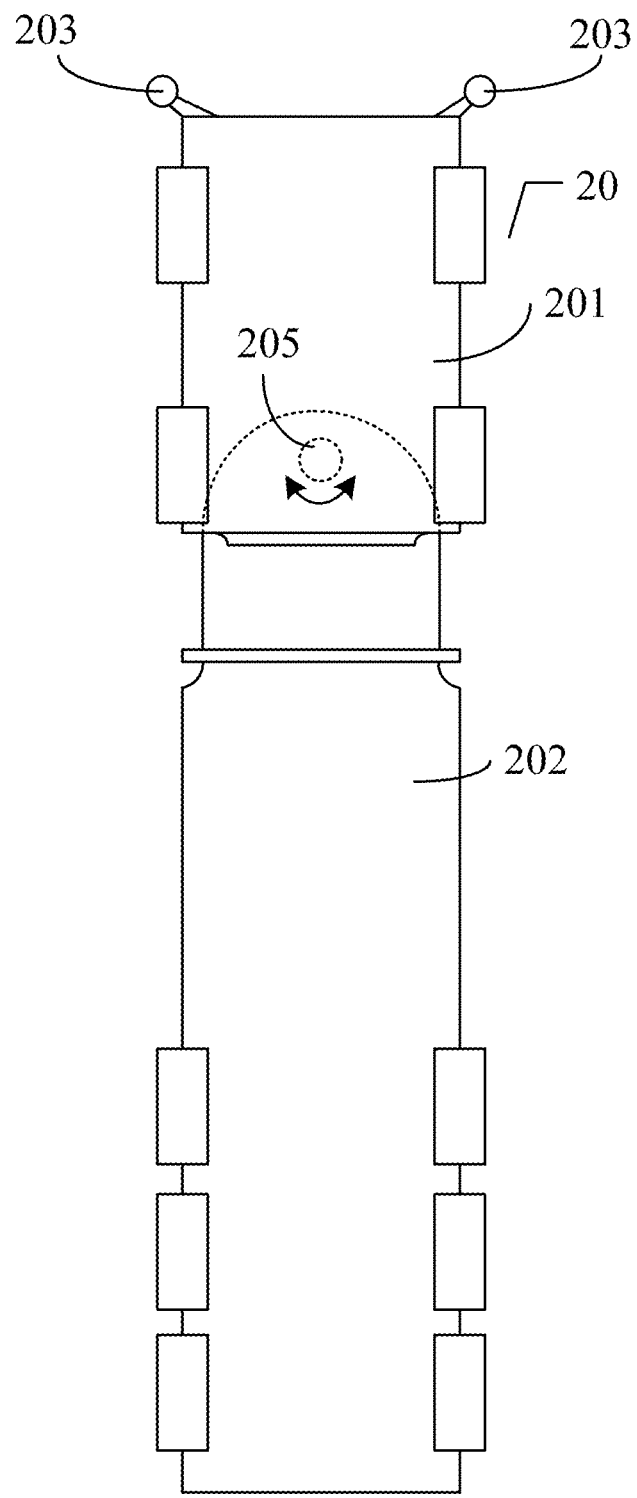
FIG. 3 is a bottom view of a structure of a semi-trailer according to an embodiment of the present disclosure.

As shown in FIG. 2, an embodiment of the present disclosure provides a method for trailer angle measurement, which is applied to a semi-trailer 20 as shown in FIG. 3 (FIG. 3 is a bottom view of the semi-trailer 20). The semi-trailer 20 includes a tractor 201 and a trailer 202. The tractor 201 and the trailer 202 are connected by a shaft 205, such that the trailer 202 can rotate with respect to the tractor 201. On each of two sides of the tractor 201 (such as the left and right sides of the front part of the tractor 201, i.e., the front face of the vehicle), at least one multi-line LiDAR 203 is provided (for example, one, two, or more multi-line LiDARs can be provided on each of the left and right sides, as shown in FIG. 3, which only shows one multi-line LiDAR on each of the left and right sides for the purpose of illustration).

The method for trailer angle measurement includes the following steps.

At step 301, in a predetermined vehicle coordinate system, an initial trailer model corresponding to an initial trailer angle value is obtained, to obtain initial point cloud data in the initial trailer model.

At step 302, the multi-line LiDAR provided on each of the two sides of the tractor is controlled to emit laser light, such that a surface of the trailer reflects the laser light emitted by the multi-line LiDAR.

At step 303, each of the multi-line LiDARs is controlled to receive a corresponding laser point cloud reflected by the surface of the trailer.

At step 304, a trailer angle is calculated based on the corresponding laser point clouds received by the respective multi-line LiDARs and the initial point cloud data using a point cloud matching algorithm.

Figure 4:
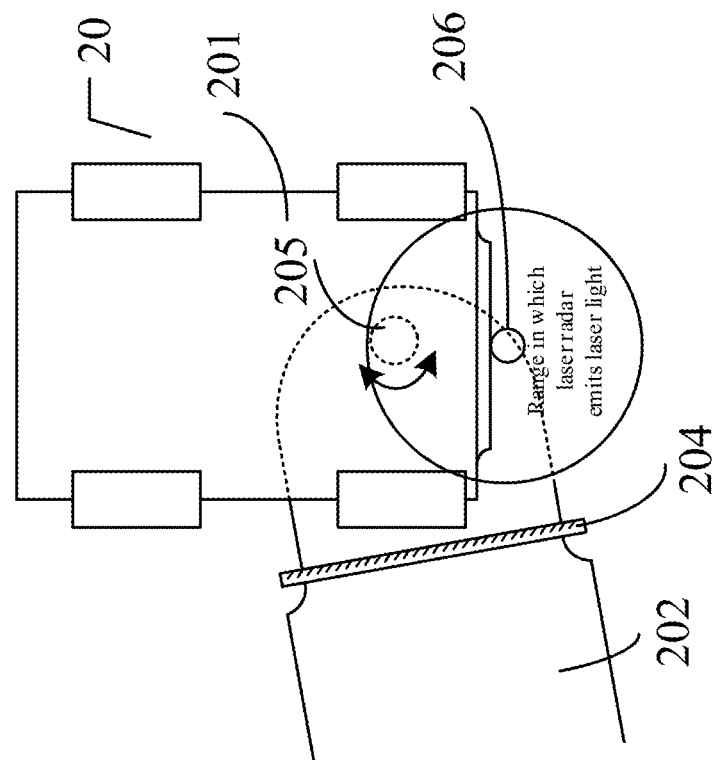
FIG. 4 is a schematic diagram showing an operation scenario in which only one LiDAR is provided at a rear part of a tractor according to an embodiment of the present disclosure.
Figure 4:
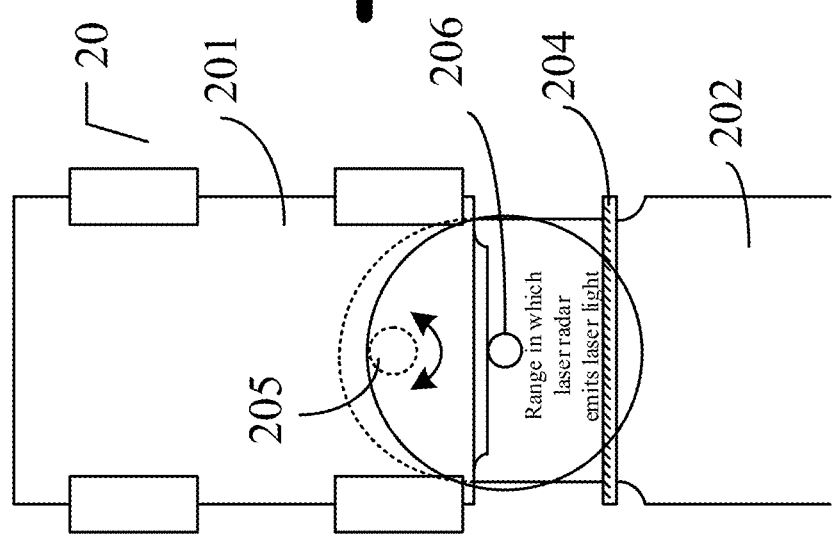

Here, as shown in FIG. 4, a reflector 204 with a reflective surface can be fixedly provided at a front part of the trailer 202, one LiDAR (typically a single-line LiDAR) 206 can be provided at a rear part of the tractor 201 (typically at the middle of a rear part of the tractor), and the reflective surface faces the LiDAR 206. Since only one LiDAR 206 provided at the rear part of the tractor 201 can also emit laser light towards the reflective surface of the reflector 204, the one LiDAR 206 may be generally sufficient for measurement of the trailer angle. However, when the trailer angle is relatively large, as shown in FIG. 4, the reflector 204 may have moved to a side of the tractor 201 and entered a blind zone of the LiDAR 206, and the laser light emitted by the one LiDAR 206 cannot reach the reflective surface of the laser reflector 204, resulting in a failure in the measurement of the trailer angle. Therefore, in an embodiment of the present disclosure, the solution shown in FIG. 4 can also be used to measure the trailer angle when the trailer angle is small (e.g., smaller than 40°), and the above steps 301 to 304 can be used to measure the trailer angle when trailer angle is large (e.g., larger than or equal to 40°). The present disclosure is not limited to this example. The above steps 301 to 304 in the embodiment of the present disclosure may also be used to measure the trailer angle when the trailer angle is small.

Figure 5:
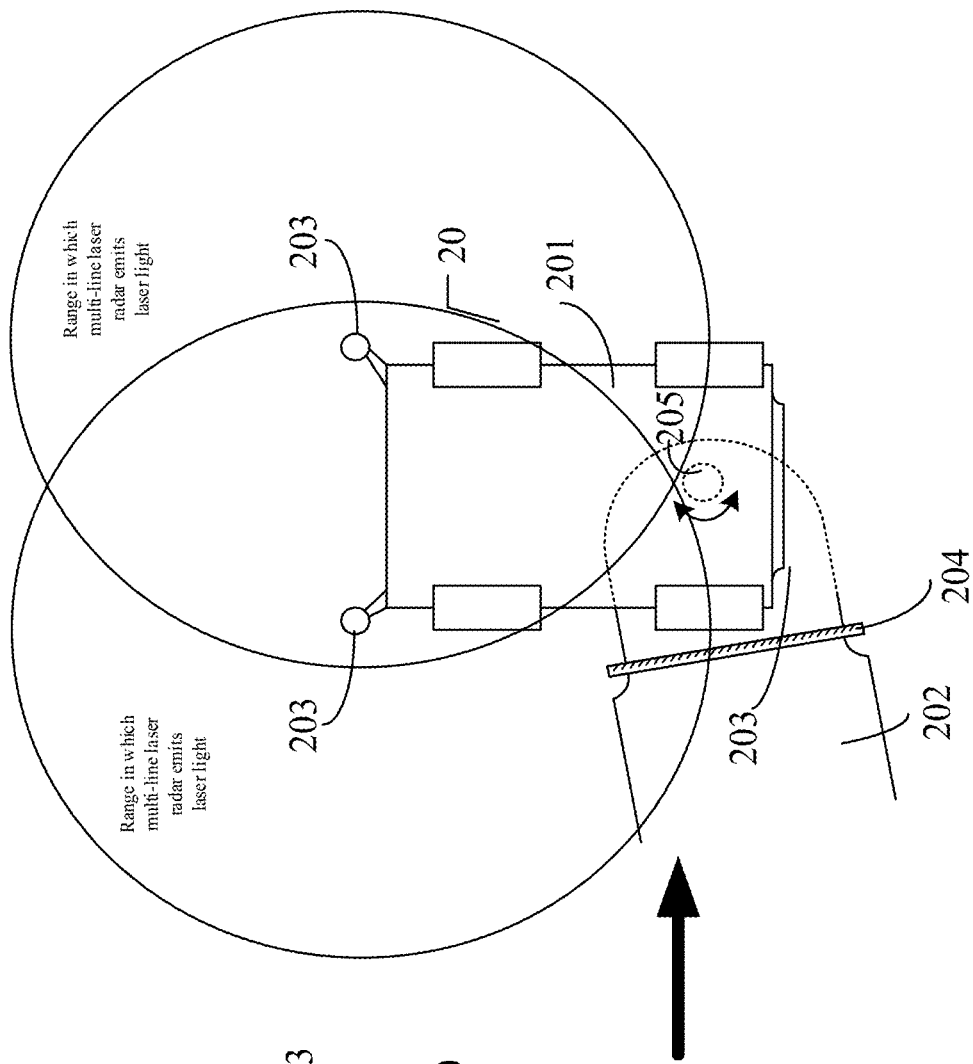
FIG. 5 is a schematic diagram showing an operation scenario in which one multi-line LiDAR is provided on each of two sides of a tractor according to an embodiment of the present disclosure.
Figure 5:
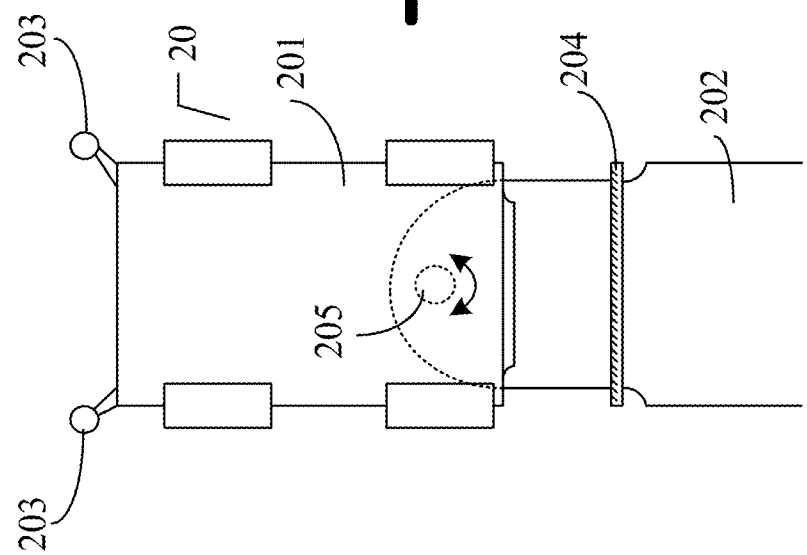

However, as shown in FIG. 5, in the present disclosure, on each of two sides of the tractor 201 (such as the left and right sides of the front part of the tractor 201, i.e., the front face of the vehicle), at least one multi-line LiDAR 203 is provided (for example, one, two, or more multi-line LiDARs can be provided on each of the left and right sides, as shown in FIG. 5, which only shows one multi-line LiDAR on each of the left and right sides for the purpose of illustration). When the reflector 204 moves to a side of the tractor 201, the laser light emitted by the multi-line LiDAR on at least one side can reach the surface of the trailer and thus can be used for measurement of the trailer angle. In addition, in the present disclosure, the trailer angle is calculated based on the corresponding laser point clouds received by the respective multi-line LiDARs and the initial point cloud data corresponding to the initial trailer angle value, instead of a laser point cloud of a single LiDAR, such that the accuracy of the result is greatly improved.

Figure 6:
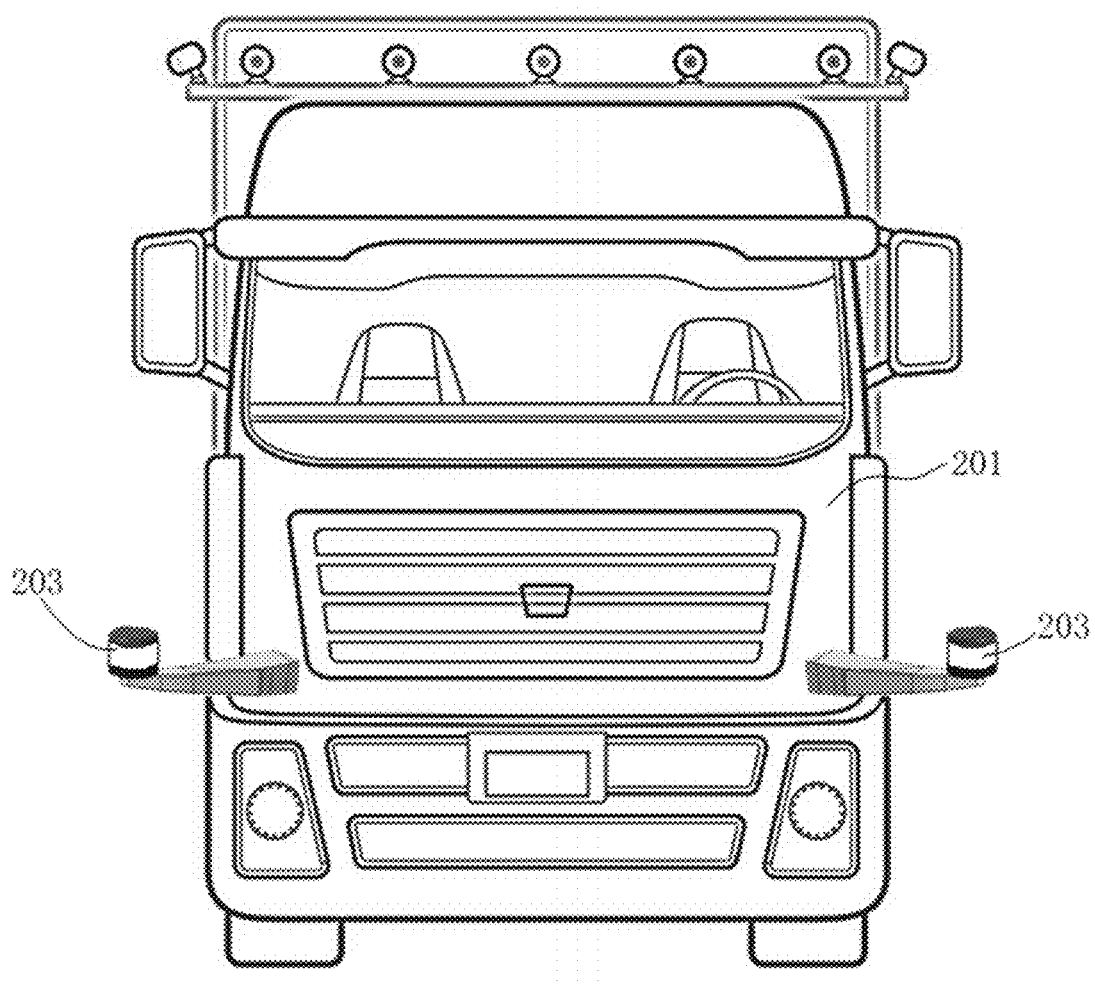
FIG. 6 is a first schematic diagram showing a distribution of multi-line LiDARs on two sides of a tractor according to an embodiment of the present disclosure.
Figure 7:
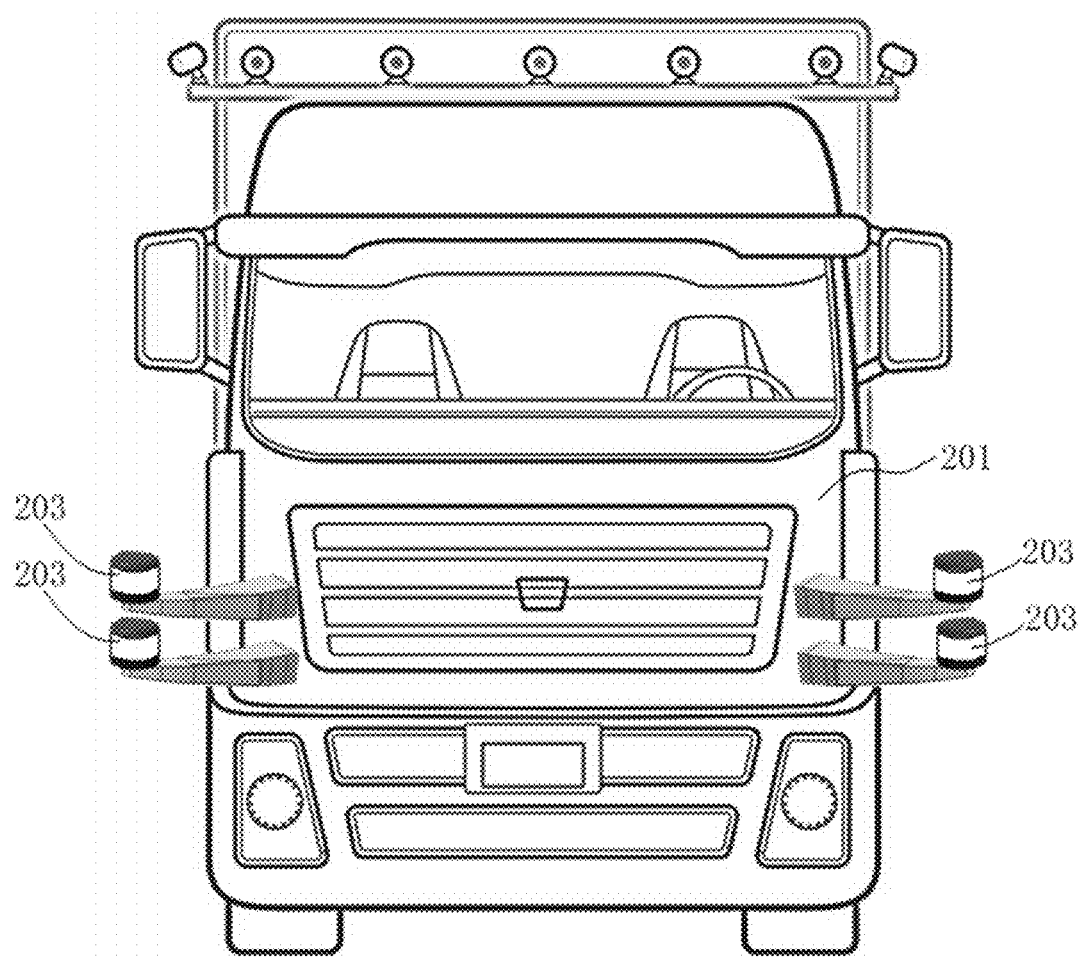
FIG. 7 is a second schematic diagram showing a distribution of multi-line LiDARs on two sides of a tractor according to an embodiment of the present disclosure.

Here, in order to illustrate that at least one multi-line LiDAR 203 is provided on each of two sides of the tractor 201, as shown in FIGS. 6 and 7, the distribution of the multi-line LiDARs 203 at the front part of the tractor 201 may include one multi-line LiDAR 203 (as shown in FIG. 6), or two multi-line LiDARs 203 (as show in FIG. 7), being provided on each of the left and right sides. However, the present disclosure is not limited to any of these examples. Without consideration for the cost, even more multi-line LiDARs can be provided on the left and right sides.

Figure 8:
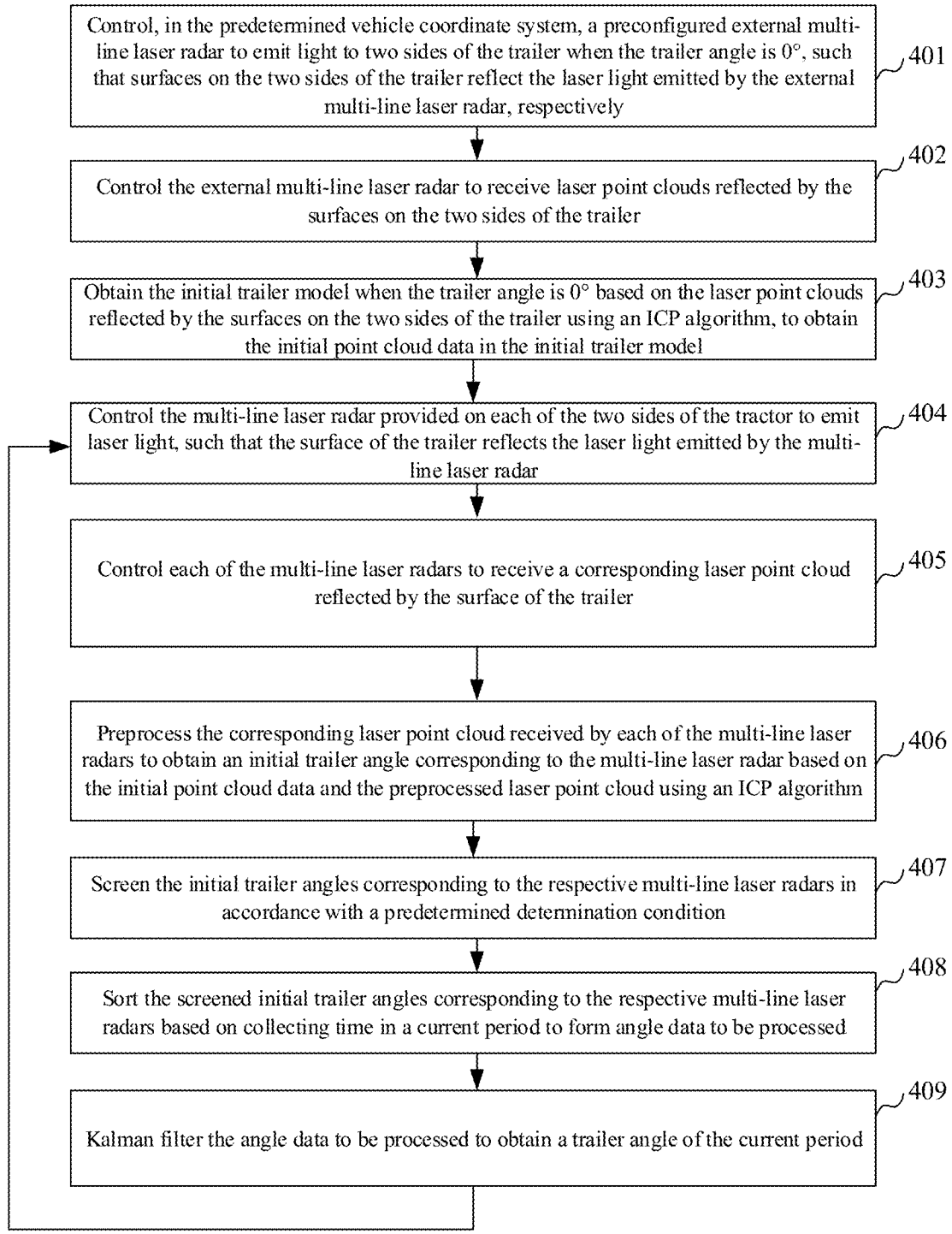
FIG. 8 is a second flowchart illustrating a method for trailer angle measurement according to an embodiment of the present disclosure.

In order to enable those skilled in the art to better understand the present disclosure, a more detailed embodiment will be given below. As shown in FIG. 8, an embodiment of the application provides a method for trailer angle measurement, which can be applied to the above semi-trailer 20 as shown in FIG. 3. The structure of the semi-trailer 20 has been described above and will not be repeated here. The method includes the following steps.

At step 401, in the predetermined vehicle coordinate system, a preconfigured external multi-line LiDAR is controlled to emit light to two sides of the trailer when the trailer angle is 0°, such that surfaces on the two sides of the trailer reflect the laser light emitted by the external multi-line LiDAR, respectively.

At step 402, the external multi-line LiDAR is controlled to receive laser point clouds reflected by the surfaces on the two sides of the trailer.

At step 403, the initial trailer model when the trailer angle is 0° is obtained based on the laser point clouds reflected by the surfaces on the two sides of the trailer using an ICP algorithm, to obtain the initial point cloud data in the initial trailer model.

Figure 9:
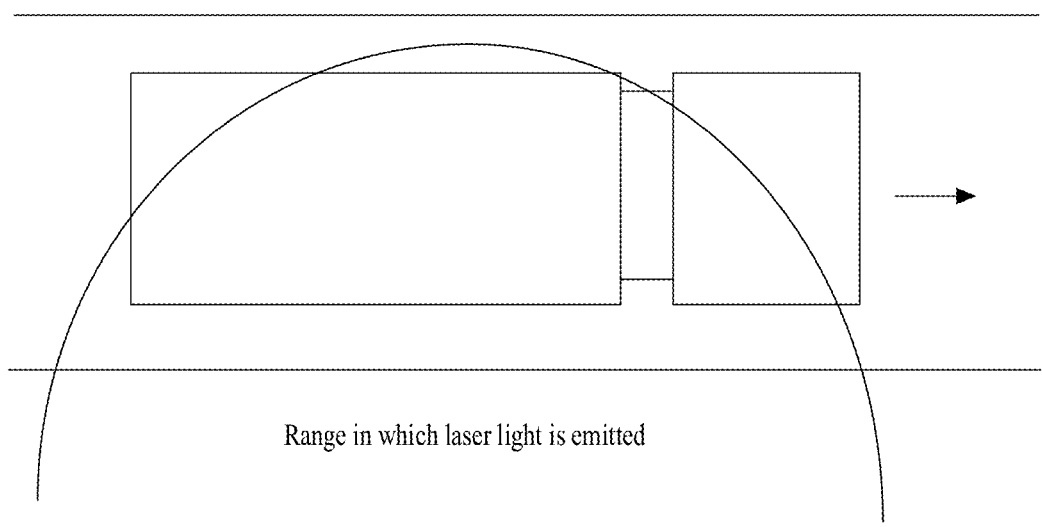
FIG. 9 is a schematic diagram showing a collecting environment of an external multi-line LiDAR according to an embodiment of the present disclosure.
Figure 9:
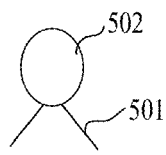
Figure 9:
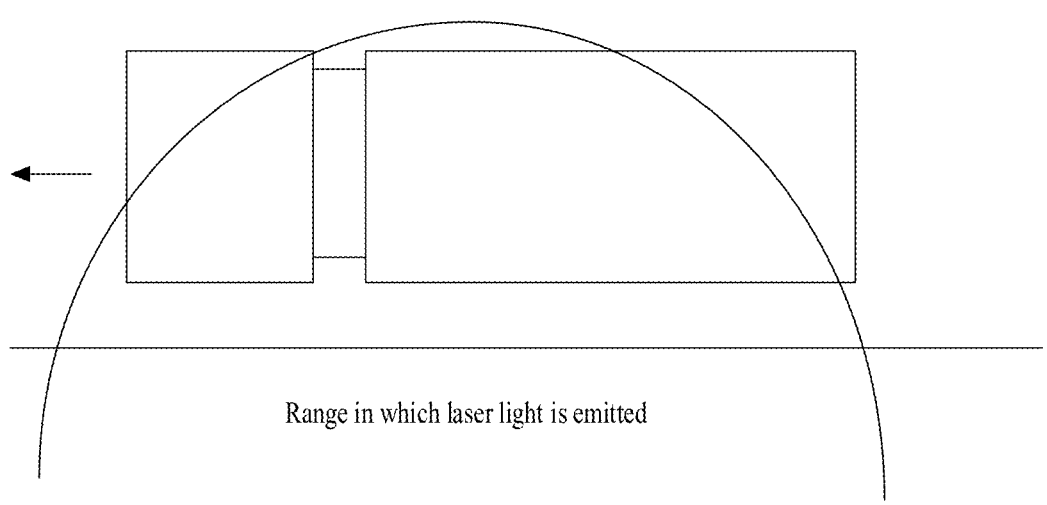
Figure 9:
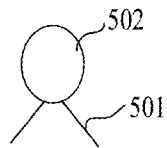

In general, the above steps 401 to 403 can be implemented as follows. As shown in FIG. 9, a bracket 501 can be provided on one side of a lane in which the vehicle is moving, and an external multi-line LiDAR 502 can be arranged on the bracket 501 (e.g., at a height above 2 m). In this way, the vehicle can maintain the trailer angle at 0°, while entering a range in which the external multi-line LiDAR 502 emit laser light from one side, and then entering the range in which the external multi-line LiDAR 502 emit laser light from the other side. Therefore, the laser light can reach both sides of the trailer, and the external multi-line LiDAR 502 can collect laser point clouds for both sides of the trailer. Then, using the ICP algorithm, the initial trailer model when the trailer angle is 0° can be obtained, and in turn the initial point cloud data in the initial trailer model can be obtained. Here, the initial point cloud data is denoted as {Pt}.

At step 404, the multi-line LiDAR provided on each of the two sides of the tractor is controlled to emit laser light, such that the surface of the trailer reflects the laser light emitted by the multi-line LiDAR.

It is to be noted here that the multi-line LiDARs and the external multi-line LiDAR used in the embodiment of the present disclosure may be e.g., 16-line, 32-line, or 64-line LiDARs, and the present disclosure is not limited to any of these examples.

At step 405, each of the multi-line LiDARs is controlled to receive a corresponding laser point cloud reflected by the surface of the trailer.

Typically, the sampling frequency of each multi-line LiDAR can be 10 Hz, but the present disclosure is not limited to this. In addition, each multi-line LiDAR can emit laser light with its own identification, so as to ensure that when the multi-line LiDAR receives the laser point cloud reflected by the surface of the trailer, it can only receive its corresponding laser point cloud, without receiving the laser point clouds corresponding to other multi-line LiDARs. In addition, in order to sort initial trailer angles corresponding to the respective multi-line LiDARs based on collecting time in a current period at step 408 later, the collecting time of the respective multi-line LiDARs is preferably different, so as to avoid two or more initial trailer angles being collected at the same time and difficult to be distinguished from one another. In addition, due to the structural characteristics of the semi-trailer 20, when there is a certain trailer angle, generally only the multi-line LiDAR(s) on one side can receive the laser point cloud reflected by the surface of the trailer.

At step 406, the corresponding laser point cloud received by each of the multi-line LiDARs is preprocessed to obtain an initial trailer angle corresponding to the multi-line LiDAR based on the initial point cloud data and the preprocessed laser point cloud using an ICP algorithm.

Here, the step 406 can be implemented using an ICP algorithm.

At Step 1, the corresponding laser point cloud received by each of the multi-line LiDARs can be Area of Interest (AOI) filtered to obtain a laser point cloud within a predetermined area range.

Here, the predetermined area range can be determined as follows. Based on a trailer angle in a previous period and a trailer size known in advance, an area range having a predetermined distance from a peripheral of the trailer in the previous period can be determined as the predetermined area range.

For example, the following scheme can be used.

Figure 10:
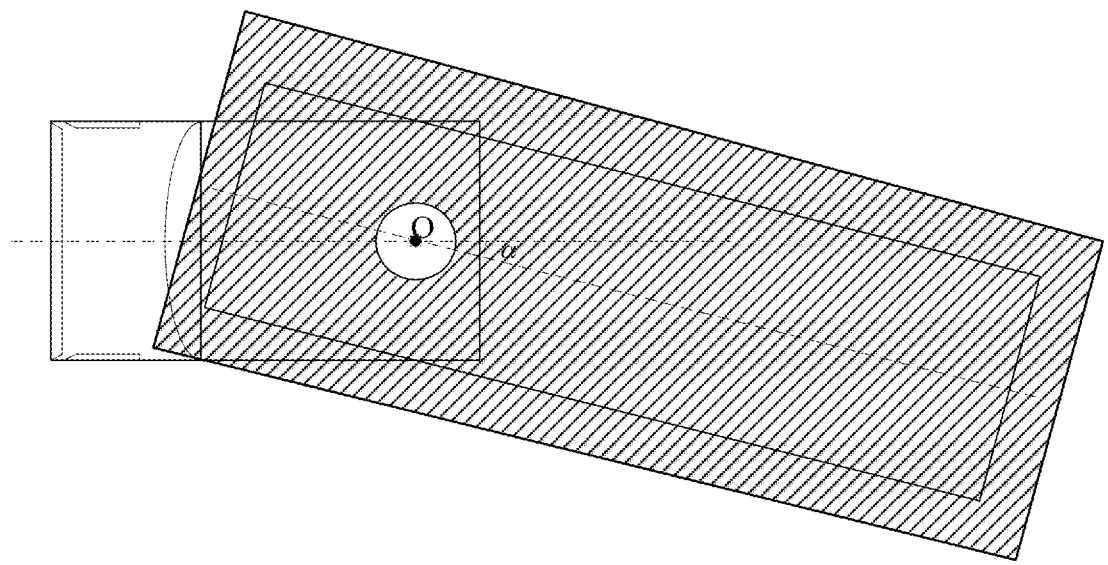
FIG. 10 is a schematic diagram showing a predetermined area range according to an embodiment of the present disclosure.

As shown in FIG. 10, when the trailer angle in the previous cycle and the trailer size known in advance are known, a current posture of the trailer can be obtained, such that an area range having a predetermined distance from a peripheral of the trailer in the previous period can be determined as the predetermined area range (the shaded part in the figure only describes the area on a plane, but in fact, there may be similar areas above and below the trailer, such that a three-dimensional area range can be determined as the predetermined area range. The reason for this is that the time between consecutive periods is relatively short (typically 0.1 s) and the trailer angle changes slightly. Therefore, the trailer has a small change in the current period when compared with the previous period, and should be within the predetermined area range.

At Step 2, the laser point cloud within the predetermined area range can be noise filtered to obtain a noise filtered laser point cloud corresponding to each of the multi-line LiDARs to form a current trailer model corresponding to the multi-line LiDAR.

Here, the noise filtering can be used to filter out outliers, so as to obtain a more accurate laser point cloud. Here, a set of points in the current trailer model is denoted as {Pn}, where n is a positive integer. For example, {P1} represents a set of points in the first trailer model.

At Step 3, for each point in the current trailer model, a point with a closest straight-line distance to the point in an initial point cloud data set can be determined as a target point.

At Step 4, each point is moved to its corresponding target point using an SVD algorithm to obtain a next trailer model, and a model matrix at a current iteration can be generated.

Here, the model matrix at the current iteration includes a rotation matrix at the current iteration and a translation matrix at the current iteration. The rotation matrix at the current iteration includes trigonometric function relationships for current deflection angles of three coordinate axes in the vehicle coordinate system.

The method returns to Step 3 after Step 4, until a distance between each point in the current trailer model and the target point becomes smaller than a predetermined distance threshold, and proceeds with Step 5.

Figure 11:
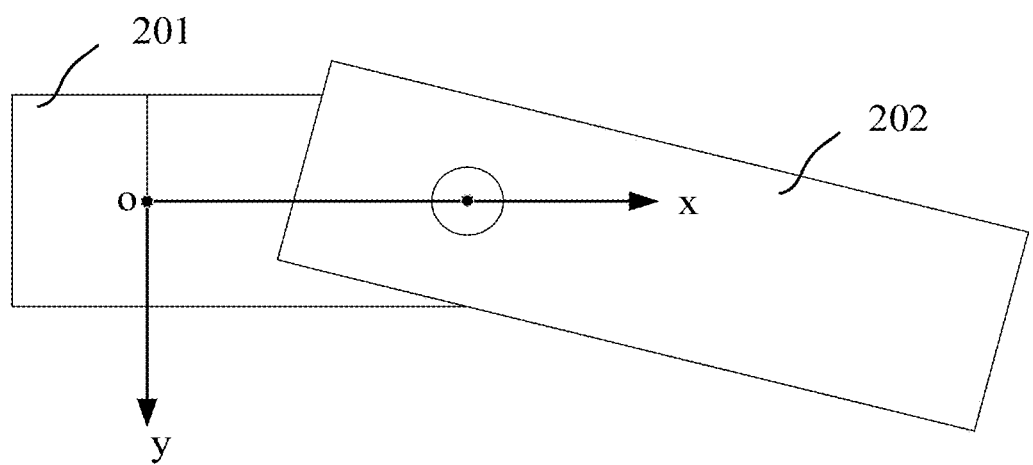
FIG. 11 is a schematic diagram of a LiDAR coordinate system established according to an embodiment of the present disclosure.

In an embodiment of the present disclosure, after the multi-line LiDARs are installed, a LiDAR coordinate system is established. The position information of the laser point clouds of the multi-line LiDARs is based on the LiDAR coordinate system. For example, the LiDAR coordinate system as shown in FIG. 11 can be established, and the present disclosure is not limited to this. In the establishment of the LiDAR coordinate system, another direction can be selected as the x-axis, a direction perpendicular to the x-axis on the horizontal plane can be the y-axis, and a direction perpendicular to both the x-axis and the y-axis can be the z-axis (not shown, typically vertically upward), and further details will be omitted here.

In this way, after each iteration, the obtained model matrix An can be denoted as $$An = \begin{bmatrix} Rn & Tn \\ 0 & 0 & 0 & 1 \end{bmatrix},$$

where Rn is the rotation matrix at the n-th iteration, which is a matrix with 3 rows and 3 columns; Tn is the translation matrix at the current iteration, which is a 3 rows and 1 column. The rotation matrix Rn at the n-th iteration is typically composed of 3 rotations, i.e., Rn=Rxn·Ryn·Rzn, where Rxn is the rotation matrix for the x-axis in the vehicle coordinate system at the n-th iteration, Ryn is the rotation matrix for the y-axis in the vehicle coordinate system at the n-th iteration, and Rzn is the rotation matrix for the z-axis in the vehicle coordinate system at the n-th iteration. For example, in one embodiment:

$$Rn = Rxn \cdot Ryn \cdot Rzn$$

$$= \begin{pmatrix} 1 & 0 & 0 \\ 0 & \cos\theta xn & -\sin\theta xn \\ 0 & \sin\theta xn & \cos\theta xn \end{pmatrix} \begin{pmatrix} \cos\theta yn & 0 & \sin\theta yn \\ 0 & 1 & 0 \\ -\sin\theta yn & 0 & \cos\theta yn \end{pmatrix} \begin{pmatrix} \cos\theta zn & -\sin\theta zn & 0 \\ \sin\theta zn & \cos\theta zn & 0 \\ 0 & 0 & 1 \end{pmatrix} =$$

$$\begin{pmatrix} \cos\theta yn\cos\theta zn & -\cos\theta yn\sin\theta zn & \sin\theta yn \\ \cos\theta xn\sin\theta zn + \sin\theta xn\sin\theta yn\cos\theta zn & \cos\theta xn\cos\theta zn - \sin\theta xn\sin\theta yn\sin\theta zn & -\sin\theta xn\cos\theta yn \\ \sin\theta xn\sin\theta zn - \cos\theta xn\sin\theta yn\cos\theta zn & \sin\theta xn\cos\theta zn + \cos\theta xn\sin\theta yn\sin\theta zn & \cos\theta xn\cos\theta yn \end{pmatrix}$$

where θxn is the deflection angle of the x-axis in the vehicle coordinate system at the n-th iteration, θyn is the deflection angle of the y-axis in the vehicle coordinate system at the n-th iteration, and θzn is the deflection angle of the z-axis in the vehicle coordinate system at the n-th iteration.

The translation matrix at the current iteration can be denoted as $$Tn = \begin{pmatrix} an \\ bn \\ cn \end{pmatrix},$$

where an, bn, and cn are translation amounts at the n-th iteration.

At Step 5, the model matrices at respective iterations can be multiplied to obtain a result matrix.

Here, for example, if in total n iterations are performed, the model matrices at the respective iterations can be multiplied to obtain the result matrix as A=An·A(n−1)· . . . ·A2·A1. The result matrix includes a result rotation matrix and a result translation matrix. The result rotation matrix includes trigonometric function relationships for deflection angles of the three coordinate axes in the vehicle coordinate system. For example, the result rotation matrix R in the result matrix A can be represented as $$\begin{bmatrix} m_{00} & m_{01} & m_{02} \\ m_{10} & m_{11} & m_{12} \\ m_{20} & m_{21} & m_{22} \end{bmatrix},$$

where $m_{00}$ to $m_{22}$ indicate trigonometric function relationships for deflection angles at respective positions in the result rotation matrix R. Since the trigonometric function relationships here are complicated, details thereof will be omitted here.

At Step 6, the initial trailer angle corresponding to each of the multi-line LiDARs can be determined based on the result rotation matrix.

For example, when the result rotation matrix R is represented as $$\begin{bmatrix} m_{00} & m_{01} & m_{02} \\ m_{10} & m_{11} & m_{12} \\ m_{20} & m_{21} & m_{22} \end{bmatrix},$$

the following applies:

$\theta x = a \tan 2(m_{12}, m_{22})$ $\cos \theta y = \sqrt{m_{\infty}^2 + m_{01}^2}$ $\theta y = a \tan 2(-m_{02}, \cos \theta y)$ $\theta z = a \tan 2(\sin \theta x \cdot m_{20} - \cos \theta x \cdot m_{10}, \cos \theta x \cdot m_{11} - \sin \theta x \cdot m_{21})$ where θx, θy, and θz are the deflection angles in the current period around the x-axis, y-axis, and z-axis, respectively. θz is equivalent to the initial trailer angle.

At step 407, the initial trailer angles corresponding to the respective multi-line LiDARs are screened in accordance with a predetermined determination condition.

Here, the step 407 can be implemented in any of the following two schemes. Of course, it can alternatively be implemented in a combination of the two schemes:

Scheme 1

It can be determined whether a number of points in the noise filtered laser point cloud corresponding to each of the multi-line LiDARs is smaller than a predetermined number threshold.

The initial trailer angle corresponding to any multi-line LiDAR having the number of points in the noise filtered laser point cloud corresponding to the multi-line LiDAR smaller than the predetermined number threshold can be discarded, and the initial trailer angle corresponding to each multi-line LiDAR having the number of points in the noise filtered laser point cloud corresponding to the multi-line LiDAR greater than or equal to the predetermined number threshold can be retained.

Here, if the number of points in the noise filtered laser point cloud corresponding to any multi-line LiDAR is smaller than the predetermined number threshold, it means that the current trailer model corresponding to the multi-line LiDAR is fitted using a relatively small number of laser point clouds. If the current trailer model is fitted using only few laser point clouds, the obtained initial trailer angle may be highly inaccurate and should be discarded.

Scheme 2

When the current period is not the first period, it can be determined whether an angle deviation value between the initial trailer angle corresponding to each of the multi-line LiDARs in the current period and a Kalman filtered trailer angle obtained in a previous period is greater than a predetermined angle deviation threshold.

The initial trailer angle corresponding to any multi-line LiDAR in the current period can be discarded when the angle deviation value between the initial trailer angle corresponding to the multi-line LiDAR in the current period and the Kalman filtered trailer angle obtained in the previous period is greater than the predetermined angle deviation threshold.

The initial trailer angle corresponding to each multi-line LiDAR in the current period can be retained when the angle deviation value between the initial trailer angle corresponding to the multi-line LiDAR in the current period and the Kalman filtered trailer angle obtained in the previous period is smaller than or equal to the predetermined angle deviation threshold.

Here, since the time difference between two consecutive periods is small (typically only 0.1 seconds), the trailer angle will not change significantly. Therefore, if the angle deviation value between the initial trailer angle corresponding to the multi-line LiDAR in the current period and the Kalman filtered trailer angle obtained in the previous period is greater than the predetermined angle deviation threshold, it can be determined that the initial trailer angle corresponding to the multi-line LiDAR in the current period is invalid and should be discarded.

At step 408, the screened initial trailer angles corresponding to the respective multi-line LiDARs are sorted based on collecting time in a current period to form angle data to be processed.

Figure 12:
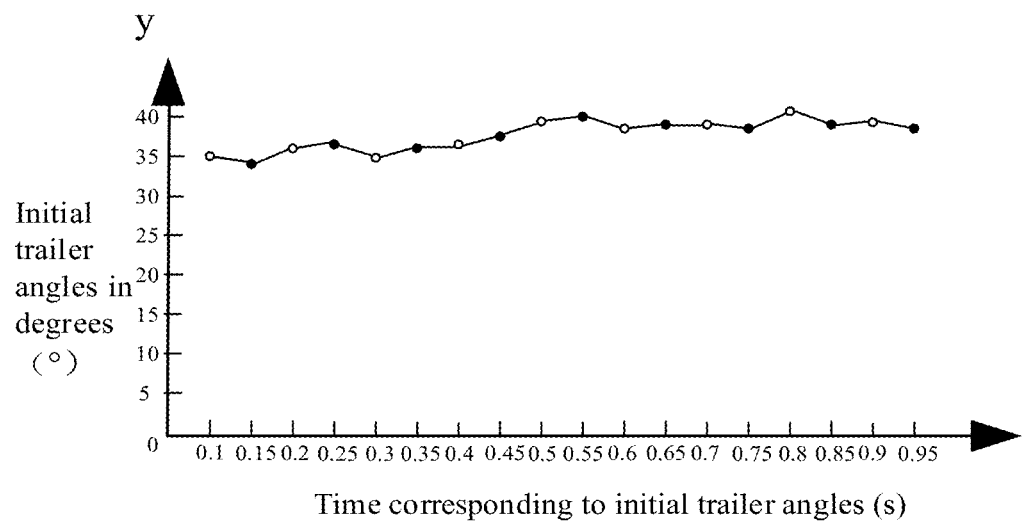
FIG. 12 is a schematic diagram showing a curve of angle data to be processed according to an embodiment of the present disclosure.

For example, when two multi-line LiDARs are provided on each of the left and right sides of the front face of the tractor (e.g., assuming that only initial trailer angles corresponding to the two multi-line LiDARs on the left side are measured), the measurement period of the multi-line LiDARs is 0.1 s, and a difference between measuring time of the two multi-line LiDARs is 0.05 s, as shown in FIG. 12, the abscissa represents time corresponding to the initial trailer angles, and the ordinate represents the initial trailer angles in degrees, and the entire ordinate data constitutes the angle data to be processed.

At step 409, the angle data to be processed is Kalman filtered to obtain a trailer angle of the current period.

The reason behind the Kalman filtering here is that the surface of the trailer is not flat, and the multi-line LiDARs themselves also have observation errors, resulting in some error in the calculated initial trailer angles. This phenomenon is manifested as jumps of ±1° to 2° in the angles when the vehicle is stationary. In order to solve this problem, Kalman filtering can be used to reduce the noise in the initial trailer angles sorted based on the collecting time in the angle data to be processed, and fuse the initial trailer angles and a simple kinematics model of angle changes to obtain a smooth output result. In this way, it can not only ensure that the errors in the measured data of the trailer angles measured in the stationary state are within ±0.5°, but also ensure that the measured data can change accordingly in real time when the trailer angle changes rapidly, so as to avoid obvious delays.

After the above step 409, the method can return to the step 404 for the next cycle of trailer angle measurement.

It can be seen that the above steps 401 to 409 provide a method for fast and accurate measurement of a trailer angle with a simple structure.

In addition, an embodiment of the present disclosure also provides an apparatus for trailer angle measurement. The apparatus includes a memory, a processor, and a computer program stored on the memory and executable by the processor. The processor is configured to, when executing the computer program, implement the above method corresponding to FIG. 2 or 8.

In addition, an embodiment of the present disclosure also provides a computer-readable storage medium. The computer-readable storage medium has a computer program stored thereon. The program, when executed by a processor, implements the above method corresponding to FIG. 2 or 8.

Figure 13:
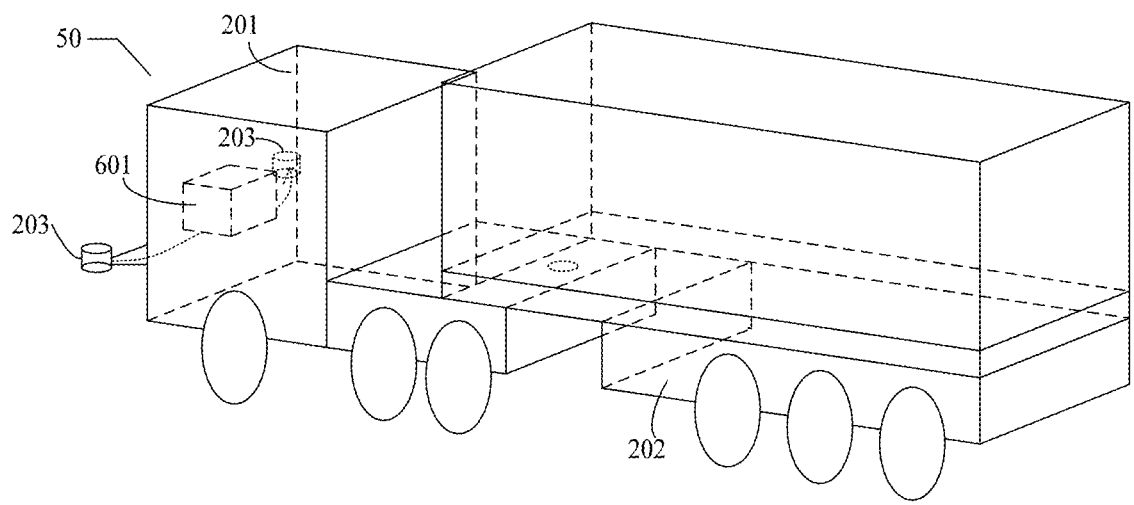
FIG. 13 is a schematic diagram showing a structure of a vehicle according to an embodiment of the present disclosure.

In addition, as shown in FIG. 13, an embodiment of the present disclosure also provides a vehicle 50. The vehicle 50 includes the above apparatus 601 for trailer angle measurement, a tractor 201, and a trailer 202 (the trailer 202 in the present disclosure may carry a container). At least one multi-line LiDAR 203 is provided on each of two sides of the tractor 201 (such as the left and right sides of the front part of the tractor 201, i.e., the front face of the vehicle). The apparatus 601 for trailer angle measurement is communicatively connected to the multi-line LiDARs 203.

With the method and apparatus for trailer angle measurement and the vehicle according to the embodiments of the present disclosure, at least one multi-line LiDAR is provided on each of the two sides of the tractor. The multi-line LiDARs provided on two sides can radiate laser light to the surface of the trailer. Accordingly, a trailer angle can be calculated based on corresponding laser point clouds received by the respective multi-line LiDARs and the initial point cloud data using a point cloud matching algorithm. In addition, in the present disclosure, the trailer angle is calculated based on the corresponding laser point clouds received by the respective multi-line LiDARs and the initial point cloud data corresponding to the initial trailer angle value, instead of a laser point cloud of a single LiDAR, such that the accuracy of the result is greatly improved.

The basic principles of the present disclosure have been described above with reference to the embodiments. However, it can be appreciated by those skilled in the art that all or any of the steps or components of the method or device according to the present disclosure can be implemented in hardware, firmware, software or any combination thereof in any computing device (including a processor, a storage medium, etc.) or a network of computing devices. This can be achieved by those skilled in the art using their basic programming skills based on the description of the present disclosure.

It can be appreciated by those skilled in the art that all or part of the steps in the method according to the above embodiment can be implemented in hardware following instructions of a program. The program can be stored in a computer-readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. The integrated module can be implemented in any hardware or software functional unit. When implemented in software functional units and sold or used as a standalone product, the integrated module can be stored in a computer-readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer-readable storage mediums (including, but not limited to, magnetic disk storage and optical storage) containing computer-readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer-readable memory that can direct a computer or any other programmable data processing device to operate in a particular way. Thus, the instructions stored in the computer-readable memory constitute a manufactured product including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have been described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for trailer angle measurement, applied in a vehicle comprising a tractor and a trailer, at least one LiDAR being provided on each of two sides of the tractor, the method comprising:

obtaining an initial trailer model containing initial point cloud data corresponding to an initial trailer angle value;

controlling the LiDAR provided on each of the two sides of the tractor to emit laser light, such that a surface of the trailer reflects the laser light emitted by the LiDAR;

controlling the LiDAR provided on each of the two sides of the tractor to receive corresponding laser light reflected by the surface of the trailer to obtain second point cloud data based on the laser light;

determining, based on a further trailer angle obtained in a previous period and a trailer size, an area range with a predetermined distance from the trailer in the previous period as a predetermined area range; and calculating a trailer angle based on the second point cloud data and the initial point cloud data using a point cloud matching algorithm, comprising:

preprocessing the second point cloud data to obtain a preprocessed point cloud data and obtaining an initial trailer angle for each of the LiDARs based on the initial point cloud data and the preprocessed point cloud data using an iterative closest point algorithm, comprising:

for each of the LiDARs,
performing area of interest filter on the second point cloud data to obtain point cloud data within the predetermined area range; and
performing noise filter on the point cloud data within the predetermined area range to obtain noise filtered point cloud data forming a current trailer model;
screening the initial trailer angle for each of the LiDARs by a predetermined determination condition;
sorting the screened initial trailer angle for each of the LiDARs based on collecting times in a current period to form angle data to be processed; and
performing kalman filter on the angle data to be processed to obtain the trailer angle.

2. The method of claim 1, wherein the said obtaining the initial trailer model containing initial point cloud data corresponding to the initial trailer angle value comprises:

controlling, in a predetermined vehicle coordinate system, an external LiDAR to emit laser light to two sides of the trailer when the trailer angle is 0°, such that surfaces on the two sides of the trailer reflect the laser light emitted by the external LiDAR, respectively; and
controlling the external LiDAR to receive laser light reflected by the surfaces on the two sides of the trailer to obtain the initial point cloud data based on the laser light to obtain the initial trailer model containing the initial point cloud data.

3. The method of claim 1, wherein the said preprocessing the second point cloud data to obtain the preprocessed point cloud data and obtaining the initial trailer angle for each of the LiDARs based on the initial point cloud data and the preprocessed point cloud using the iterative closest point algorithm further comprises:

for each point of the current trailer model,
determining a point of the initial point cloud data with a closest straight-line distance to the point as a target point;
moving the point to a place of its target point using a singular value decomposition algorithm to obtain a next trailer model, and generating a model matrix of a current iteration, the model matrix comprising a rotation matrix and a translation matrix of the current iteration, the rotation matrix comprising trigonometric function relationships for current deflection angles of three coordinate axes in a predetermined vehicle coordinate system.

4. The method of claim 3, wherein the said preprocessing the second point cloud data to obtain the preprocessed point cloud data and obtaining the initial trailer angle for each of the LiDARs based on the initial point cloud data and the preprocessed point cloud using the iterative closest point algorithm further comprises:

for each of the LiDARs,
multiplying a model matrix of each iteration to obtain a result matrix, the result matrix comprising a result rotation matrix and a result translation matrix, the result rotation matrix comprising trigonometric function relationships for deflection angles of the three coordinate axes in the predetermined vehicle coordinate system; and
determining the initial trailer angle for each of the LiDARs based on the result rotation matrix.

5. The method of claim 3, wherein the said screening initial trailer angles by the predetermined determination condition comprises:

determining whether a number of points in the noise filtered point cloud corresponding to each of the LiDARs is smaller than a predetermined number threshold; and
discarding the initial trailer angle corresponding to any of the LiDARs having the number of points smaller than the predetermined number threshold.

6. The method of claim 3, wherein the said screening initial trailer angles by the predetermined determination condition comprises:

determining whether an angle deviation value between the initial trailer angle of each of the LiDARs in the current period and the further trailer angle obtained in the previous period is greater than a predetermined angle deviation threshold; and
discarding the initial trailer angle of any of the LiDARs in the current period when the angle deviation value is greater than the predetermined angle deviation threshold.

7. A vehicle comprising an apparatus for trailer angle measurement, a tractor and a trailer, at least one LiDAR being provided on each of two sides of the tractor, the apparatus being communicatively connected to each of the LiDARs, and the apparatus comprising a memory, a processor, and a computer program stored on the memory and executable by the processor, wherein the processor is configured to, when executing the computer program, perform a process of trailer angle measurement, the process comprising:

obtaining an initial trailer model containing initial point cloud data corresponding to an initial trailer angle value;
controlling the LiDAR provided on each of the two sides of the tractor to emit laser light, such that a surface of the trailer reflects the laser light emitted by the LiDAR;
controlling the LiDAR provided on each of the two sides of the tractor to receive corresponding laser light reflected by the surface of the trailer to obtain second point cloud data based on the laser light;
determining, based on a further trailer angle obtained in a previous period and a trailer size, an area range with a predetermined distance from the trailer in the previous period as a predetermined area range; and
calculating a trailer angle based on the second point cloud data and the initial point cloud data using a point cloud matching algorithm, comprising:
preprocessing the second point cloud data to obtain a preprocessed point cloud data and obtaining an initial trailer angle for each of the LiDARs based on the initial point cloud data and the preprocessed point cloud data using an iterative closest point algorithm, comprising:
for each of the LiDARs,
performing area of interest filter on the second point cloud data to obtain point cloud data within the predetermined area range; and performing noise filter on the point cloud data within the predetermined area range to obtain noise filtered point cloud data forming a current trailer model;

screening the initial trailer angle for each of the LiDARs by a predetermined determination condition;

sorting the screened initial trailer angle for each of the LiDARs based on collecting times in a current period to form angle data to be processed; and performing kalman filter on the angle data to be processed to obtain the trailer angle.

8. The vehicle of claim 7, wherein the said obtaining, in a predetermined vehicle coordinate system, the initial trailer model containing initial point cloud data corresponding to the initial trailer angle value comprises:

controlling, in the predetermined vehicle coordinate system, an external LiDAR to emit laser light to two sides of the trailer when the trailer angle is 0°, such that surfaces on the two sides of the trailer reflect the laser light emitted by the external LiDAR, respectively; and controlling the external LiDAR to receive laser light reflected by the surfaces on the two sides of the trailer to obtain the initial point cloud data based on the laser light to obtain the initial trailer model containing the initial point cloud data.

9. The vehicle of claim 7, wherein the said preprocessing the second point cloud data to obtain the preprocessed point cloud data and obtaining the initial trailer angle for each of the LiDARs based on the initial point cloud data and the preprocessed point cloud using the iterative closest point algorithm further comprises:

for each point of the current trailer model, determining a point of the initial point cloud data with a closest straight-line distance to the point as a target point;

moving the point to a place of its target point using a singular value decomposition algorithm to obtain a next trailer model, and generating a model matrix of a current iteration, the model matrix comprising a rotation matrix and a translation matrix of the current iteration, the rotation matrix comprising trigonometric function relationships for current deflection angles of three coordinate axes in a predetermined vehicle coordinate system.

10. The vehicle of claim 9, wherein the said preprocessing the second point cloud data to obtain the preprocessed point cloud data and obtaining the initial trailer angle for each of the LiDARs based on the initial point cloud data and the preprocessed point cloud using the iterative closest point algorithm further comprises:

for each of the LiDARs, multiplying a model matrix of each iteration to obtain a result matrix, the result matrix comprising a result rotation matrix and a result translation matrix, the result rotation matrix comprising trigonometric function relationships for deflection angles of the three coordinate axes in the predetermined vehicle coordinate system; and determining the initial trailer angle for each of the LiDARs based on the result rotation matrix.

11. The vehicle of claim 9, wherein the said screening initial trailer angles by the predetermined determination condition comprises:

determining whether a number of points in the noise filtered point cloud corresponding to each of the LiDARs is smaller than a predetermined number threshold; and discarding the initial trailer angle corresponding to any of the LiDARs having the number of points smaller than the predetermined number threshold.

12. The vehicle of claim 9, wherein the said screening initial trailer angles by the predetermined determination condition comprises:

determining whether an angle deviation value between the initial trailer angle of each of the LiDARs in the current period and the further trailer angle obtained in the previous period is greater than a predetermined angle deviation threshold; and discarding the initial trailer angle of any of the LiDARs in the current period when the angle deviation value is greater than the predetermined angle deviation threshold.

13. A non-transitory computer-readable storage medium, having a computer program stored thereon, wherein the program, when executed by a processor, implements a process of trailer angle measurement, the process being applied in a vehicle comprising a tractor and a trailer, at least one LiDAR being provided on each of two sides of the tractor, the process comprising:

obtaining an initial trailer model containing initial point cloud data corresponding to an initial trailer angle value;

controlling the LiDAR provided on each of the two sides of the tractor to emit laser light, such that a surface of the trailer reflects the laser light emitted by the LiDAR;

controlling the LiDAR provided on each of the two sides of the tractor to receive corresponding laser light reflected by the surface of the trailer to obtain second point cloud data based on the laser light;

determining, based on a further trailer angle obtained in a previous period and a trailer size, an area range with a predetermined distance from the trailer in the previous period as a predetermined area range; and calculating a trailer angle based on the second point cloud data and the initial point cloud data using a point cloud matching algorithm, comprising:

preprocessing the second point cloud data to obtain a preprocessed point cloud data and obtaining an initial trailer angle for each of the LiDARs based on the initial point cloud data and the preprocessed point cloud using an iterative closest point algorithm, comprising:

for each of the LiDARs, performing area of interest filter on the second point cloud data to obtain point cloud data within the predetermined area range; and performing noise filter on the point cloud data within the predetermined area range to obtain noise filtered point cloud data forming a current trailer model;

screening the initial trailer angle for each of the LiDARs by a predetermined determination condition;

sorting the screened initial trailer angle for each of the LiDARs based on collecting times in a current period to form angle data to be processed; and performing kalman filter on the angle data to be processed to obtain the trailer angle.

14. The non-transitory computer-readable storage medium of claim 13, wherein the said obtaining the initial trailer model containing initial point cloud data corresponding to the initial trailer angle value comprises:
  controlling, in a predetermined vehicle coordinate system, a external LiDAR to emit laser light to two sides of the trailer when the trailer angle is 0°, such that surfaces on the two sides of the trailer reflect the laser light emitted by the external LiDAR, respectively; and
  controlling the external LiDAR to receive laser light reflected by the surfaces on the two sides of the trailer to obtain the initial point cloud data based on the laser light to obtain the initial trailer model containing the initial point cloud data.

15. The non-transitory computer-readable storage medium of claim 13, wherein the said preprocessing the second point cloud data to obtain the preprocessed point cloud data and obtaining the initial trailer angle for each of the LiDARs based on the initial point cloud data and the preprocessed point cloud using the iterative closest point algorithm further comprises:
  for each point of the current trailer model,
  determining a point of the initial point cloud data with a closest straight-line distance to the point as a target point;
  moving the point to a place of its target point using a singular value decomposition algorithm to obtain a next trailer model, and generating a model matrix of a current iteration, the model matrix comprising a rotation matrix and a translation matrix of the current iteration, the rotation matrix comprising trigonometric function relationships for current deflection angles of three coordinate axes in a predetermined vehicle coordinate system;
  multiplying a model matrix of each iteration to obtain a result matrix, the result matrix comprising a result rotation matrix and a result translation matrix, the result rotation matrix comprising trigonometric function relationships for deflection angles of the three coordinate axes in the predetermined vehicle coordinate system; and
  determining the initial trailer angle for each of the LiDARs based on the result rotation matrix.

16. The non-transitory computer-readable storage medium of claim 15, wherein the said preprocessing the second point cloud data to obtain the preprocessed point cloud data and obtaining the initial trailer angle for each of the LiDARs based on the initial point cloud data and the preprocessed point cloud using the iterative closest point algorithm further comprises:
  for each of the LiDARs,
    multiplying a model matrix of each iteration to obtain a result matrix, the result matrix comprising a result rotation matrix and a result translation matrix, the result rotation matrix comprising trigonometric function relationships for deflection angles of the three coordinate axes in the predetermined vehicle coordinate system; and
    determining the initial trailer angle for each of the LiDARs based on the result rotation matrix.

17. The non-transitory computer-readable storage medium of claim 15, wherein the said screening initial trailer angles by the predetermined determination condition comprises:
  determining whether a number of points in the noise filtered point cloud corresponding to each of the LiDARs is smaller than a predetermined number threshold; and
  discarding the initial trailer angle corresponding to any of the LiDARs having the number of points smaller than the predetermined number threshold.

18. The non-transitory computer-readable storage medium of claim 15, wherein the said screening initial trailer angles by the predetermined determination condition comprises:
  determining whether an angle deviation value between the initial trailer angle of each of the LiDARs in the current period and a further trailer angle obtained in a previous period is greater than a predetermined angle deviation threshold; and
  discarding the initial trailer angle of any of the LiDARs in the current period when the angle deviation value is greater than the predetermined angle deviation threshold.

* * * * *